United States Patent
Heerboth (10) Patent No.: US 9,418,372 B2
(45) Date of Patent: Aug. 16, 2016

(54) ADVERTISING, DISCOVERING, AND USING SERVICES THROUGH VIRTUAL ACCESS POINT INTERFACES

(75) Inventor: Peter N. Heerboth, San Jose, CA (US)

(73) Assignee: Apple Inc., Cupertino, CA (US)

( * ) Notice: Subject to any disclaimer, the term of this patent is extended or adjusted under 35 U.S.C. 154(b) by 488 days.

(21) Appl. No.: 13/481,602

(22) Filed: May 25, 2012

(65) Prior Publication Data

US 2013/0317892 A1    Nov. 28, 2013

(51) Int. Cl.
| G06F 15/16 | (2006.01) |
| G06Q 30/02 | (2012.01) |
| H04W 88/08 | (2009.01) |
| H04W 4/00 | (2009.01) |
| H04W 8/00 | (2009.01) |

(52) U.S. Cl.
CPC ........... *G06Q 30/0241* (2013.01); *H04W 4/008* (2013.01); *H04W 8/005* (2013.01); *H04W 88/08* (2013.01)

(58) Field of Classification Search
CPC . H04L 67/104; H04W 76/023; H04W 84/045
USPC .......... 370/329, 336; 709/204, 224, 203, 217, 709/222, 227
See application file for complete search history.

(56) References Cited

U.S. PATENT DOCUMENTS

| 7,016,673 | B2 | 3/2006 | Reddy et al. |
| 8,194,613 | B2 * | 6/2012 | Lee et al. ....................... 370/331 |
| 8,327,178 | B2 | 12/2012 | Vandwalle et al. |
| 8,744,516 | B2 | 6/2014 | Gurevich |
| 8,812,657 | B2 | 8/2014 | Mallik et al. |
| 8,825,873 | B2 | 9/2014 | Kumar et al. |
| 2002/0184310 | A1 | 12/2002 | Traversat et al. |
| 2005/0193106 | A1 | 9/2005 | Desai et al. |
| 2007/0286136 | A1 | 12/2007 | Rittle et al. |
| 2007/0299737 | A1 | 12/2007 | Plastina et al. |
| 2008/0254745 | A1 | 10/2008 | Zhang et al. |

(Continued)

FOREIGN PATENT DOCUMENTS

| JP | 2006-501777 A | 1/2006 |
| JP | 2007-527156 A | 9/2007 |

(Continued)

OTHER PUBLICATIONS

European Search Report directed to related European Patent Application No. 13165554.0, mailed Sep. 9, 2013; 4 pages.

(Continued)

*Primary Examiner* — Joshua Joo
(74) *Attorney, Agent, or Firm* — Sterne, Kessler, Goldstein & Fox PLLC (57) ABSTRACT

The disclosed embodiments provide a system that provides a service on a first electronic device. During operation, the system uses a virtual access point interface and a discovery protocol to advertise the service on the first electronic device. The virtual access point interface may enable discovery of the service by a second electronic device without an infrastructure connection between the first and second electronic devices. Next, the system uses the virtual access point interface to establish a wireless peer-to-peer connection between the first electronic device and a second electronic device. Finally, the system provides the service to the second electronic device through the wireless peer-to-peer connection.

17 Claims, 7 Drawing Sheets

(56) References Cited

U.S. PATENT DOCUMENTS

| | | | |
|---|---|---|---|
| 2010/0118762 A1* | 5/2010 | Hashimoto et al. | 370/315 |
| 2010/0279672 A1* | 11/2010 | Koskela et al. | 455/418 |
| 2011/0060649 A1 | 3/2011 | Dunk et al. | |
| 2011/0082940 A1* | 4/2011 | Montemurro et al. | 709/227 |
| 2011/0213876 A1* | 9/2011 | Kumar et al. | 709/224 |
| 2011/0258313 A1* | 10/2011 | Mallik et al. | 709/224 |
| 2011/0268101 A1* | 11/2011 | Wang et al. | 370/344 |
| 2012/0011247 A1* | 1/2012 | Mallik et al. | 709/224 |
| 2012/0117400 A1 | 5/2012 | Vandwalle et al. | |
| 2012/0133971 A1* | 5/2012 | Park | 358/1.15 |
| 2012/0158839 A1* | 6/2012 | Hassan et al. | 709/204 |
| 2012/0317619 A1* | 12/2012 | Dattagupta et al. | 726/4 |
| 2012/0320886 A1* | 12/2012 | Anders et al. | 370/338 |
| 2013/0036231 A1* | 2/2013 | Suumaki | 709/228 |
| 2013/0094484 A1* | 4/2013 | Kneckt et al. | 370/338 |
| 2014/0187167 A1* | 7/2014 | Gupta et al. | 455/41.3 |
| 2014/0233547 A1* | 8/2014 | Vallabhu et al. | 370/338 |

FOREIGN PATENT DOCUMENTS

| | | |
|---|---|---|
| JP | 2013-514738 A | 4/2013 |
| WO | WO 2010/099226 A1 | 9/2010 |
| WO | WO 2011/087639 A1 | 7/2011 |

OTHER PUBLICATIONS

Search Report by Registered Searching Organization with attached translation directed to related Japanese Patent Application No. JP 2015-511503 A, dated Nov. 16, 2015; 84 pages.

Ververidis et al., "Service Discovery for Mobile Ad Hoc Networks: A Survey of Issues and Techniques," IEEE Communications Surveys & Tutorials, vol. 10, No. 3, 3$^{rd}$ Quarter 2008; 16 pages.

International Search Report directed to related PCT Patent Application No. PCT/US2013/038412, dated Nov. 15, 2013; 9 pages.

International Preliminary Report on Patentability with Written Opinion directed to related International Application No. PCT/US2013/038412, dated Nov. 25, 2014; 7 pages.

* cited by examiner

ADVERTISING, DISCOVERING, AND USING SERVICES THROUGH VIRTUAL ACCESS POINT INTERFACES

BACKGROUND

1. Field

The disclosed embodiments relate to wireless networks. More specifically, the disclosed embodiments relate to techniques for advertising and using services on electronic devices through virtual access point interfaces on the electronic devices.

2. Related Art

Recent improvements in computing power and wireless networking technology have significantly increased the capabilities of electronic devices. For example, laptop computers, tablet computers, portable media players, smartphones, digital media receivers, video game consoles, and/or other modern electronic devices are typically equipped with WiFi capabilities that allow the electronic devices to retrieve webpages, stream audio and/or video, share desktops and/or user interfaces (UIs), and/or transfer files wirelessly among one another.

However, conventional wireless networking technology may require the use of preexisting access points, cellular radio towers, and/or other structured networks to connect electronic devices to each other and/or the Internet. As a result, network traffic and/or communication between two electronic devices may be limited by the availability, bandwidth, signal strength, latencies, and/or capabilities of structured network components used to transmit the network traffic.

On the other hand, modern electronic devices may be capable of forming wireless ad hoc networks that bypass the use of access points, cellular towers, and/or structured networks to transmit network traffic among nodes of the wireless ad hoc networks. Instead, the electronic devices may use the wireless ad hoc networks to communicate directly with one another, thereby increasing throughput and/or removing limitations associated with transmitting data through the access points and/or structured networks. Consequently, communication among electronic devices may be facilitated by mechanisms for increasing the use of wireless ad hoc networks by the electronic devices.

SUMMARY

The disclosed embodiments provide a system that provides a service on a first electronic device. During operation, the system uses a virtual access point interface and a discovery protocol to advertise the service on the first electronic device. The virtual access point interface may enable discovery of the service by a second electronic device without an infrastructure connection between the first and second electronic devices. Next, the system uses the virtual access point interface to establish a wireless peer-to-peer connection between the first electronic device and a second electronic device. Finally, the system provides the service to the second electronic device through the wireless peer-to-peer connection.

In some embodiments, the system also disables the virtual access point interface upon detecting a termination of advertising for the service.

In some embodiments, the system also uses the infrastructure connection to provide the service to the second electronic device if the infrastructure connection is more robust (e.g., has higher signal strength, greater bandwidth, etc.) than the wireless peer-to-peer connection.

In some embodiments, the system also scans for one or more electronic devices in proximity to the first electronic device. Upon detecting the one or more electronic devices in proximity to the first electronic device, the system uses the discovery protocol to obtain a set of services advertised by the one or more electronic devices. For example, the system may browse for and/or discover services advertised by nearby electronic devices while advertising the service on the first electronic device.

In some embodiments, using the discovery protocol and the virtual access point interface to advertise the service on the first electronic device includes:
  (i) enabling the virtual access point interface in response to an advertising request for the service from an application providing the service; and
  (ii) upon receiving a discovery request from the second electronic device through the virtual access point interface, transmitting a discovery response to the discovery request through the virtual access point interface, wherein the discovery response is used by the second electronic device to access the service.

In some embodiments, the advertising request includes a request to advertise the service using a non-infrastructure mechanism.

In some embodiments, the discovery request includes one or more service offerings (e.g., advertised services) on the second electronic device. Each of the service offerings may include an advertised identifier for the service offering and data associated with the service offering. The discovery request may enable discovery of the service offering(s) by the first electronic device without requiring the first electronic device to transmit a separate discovery request to the second electronic device and receiving a discovery response from the second electronic device.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
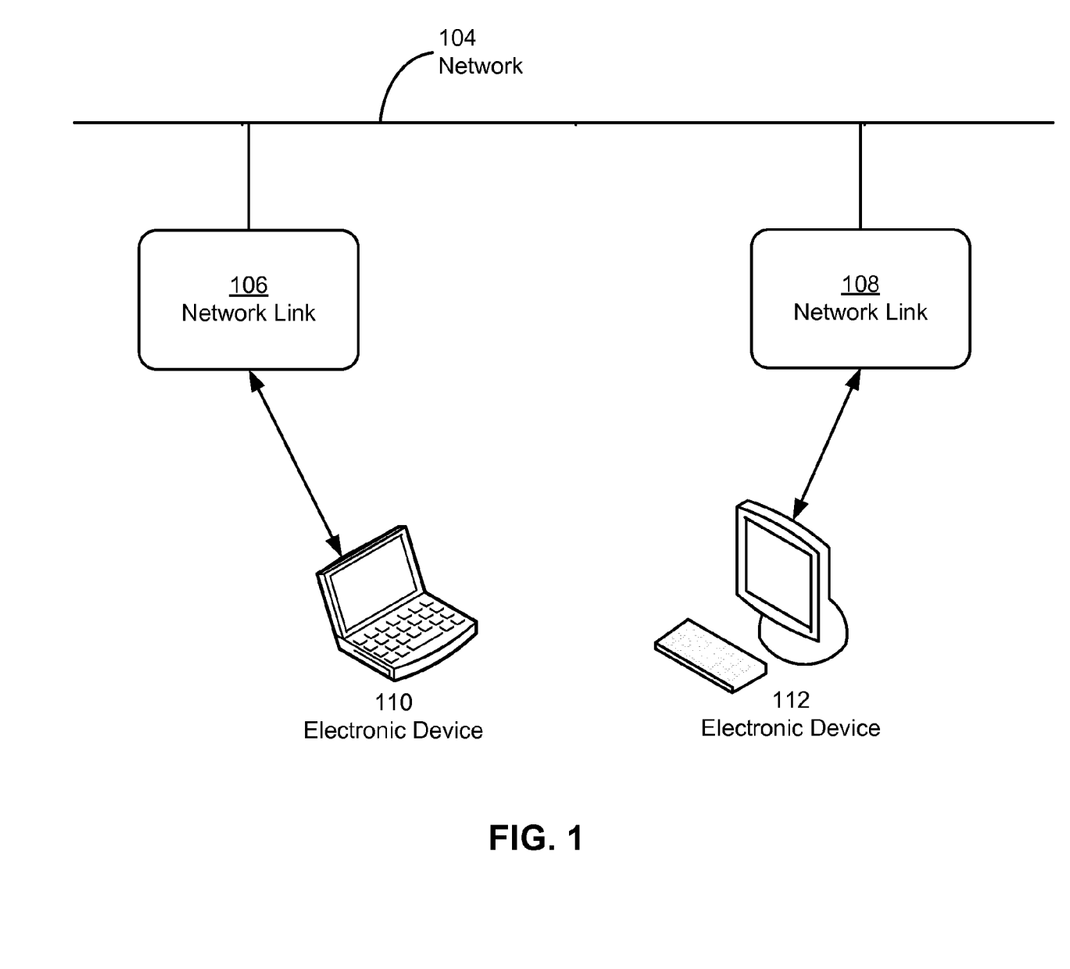
FIG. 1 shows a schematic of a system in accordance with the disclosed embodiments.

The disclosed embodiments provide a method and system for advertising, discovering, and/or using a service on an electronic device. As shown in FIG. 1, a number of electronic devices 110-112 are connected to a network 104 through network links 106-108 provided by devices such as wireless access points, cellular towers, and/or routers. Electronic devices 110-112 may correspond to personal computers, laptop computers, tablet computers, mobile phones, portable media players, digital media receivers, video game consoles, printers, scanners, and/or other network-enabled electronic devices. Network 104 may include a local area network (LAN), wide area network (WAN), personal area network (PAN), virtual private network, intranet, mobile phone network (e.g., a cellular network), WiFi network, Ethernet network, and/or other type of network with existing infrastructure (e.g., network links 106-108) that facilitates communication among electronic devices (e.g., electronic devices 110-112) connected to network 104.

Electronic devices 110-112 may communicate with one another and/or with other electronic devices or servers through network 104. For example, electronic device 110 may use a discovery protocol such as Bonjour (Bonjour™ is a registered trademark of Apple Inc.) to advertise services on electronic device 110 to electronic device 112 and/or other electronic devices on network 104. In turn, electronic device 112 may use the discovery protocol and network 104 to discover (e.g., detect) the services on electronic device 110. Finally, electronic device 112 may use the services by connecting to electronic device 110 through network 104 and accessing the services. For example, electronic device 112 may use the discovery protocol and network 104 to access services for transferring files, streaming media, printing, collaborating on documents, and/or sharing desktops on electronic device 110.

However, communication between electronic devices 110-112 may be limited by the availability, bandwidth, and/or capabilities of network links 106-108 and/or network 104. For example, each electronic device 110-112 may be unable to discover and/or use services on other electronic devices in the absence of a structured network (e.g., network 104) connecting the electronic device to the other electronic devices.

Figure 2:
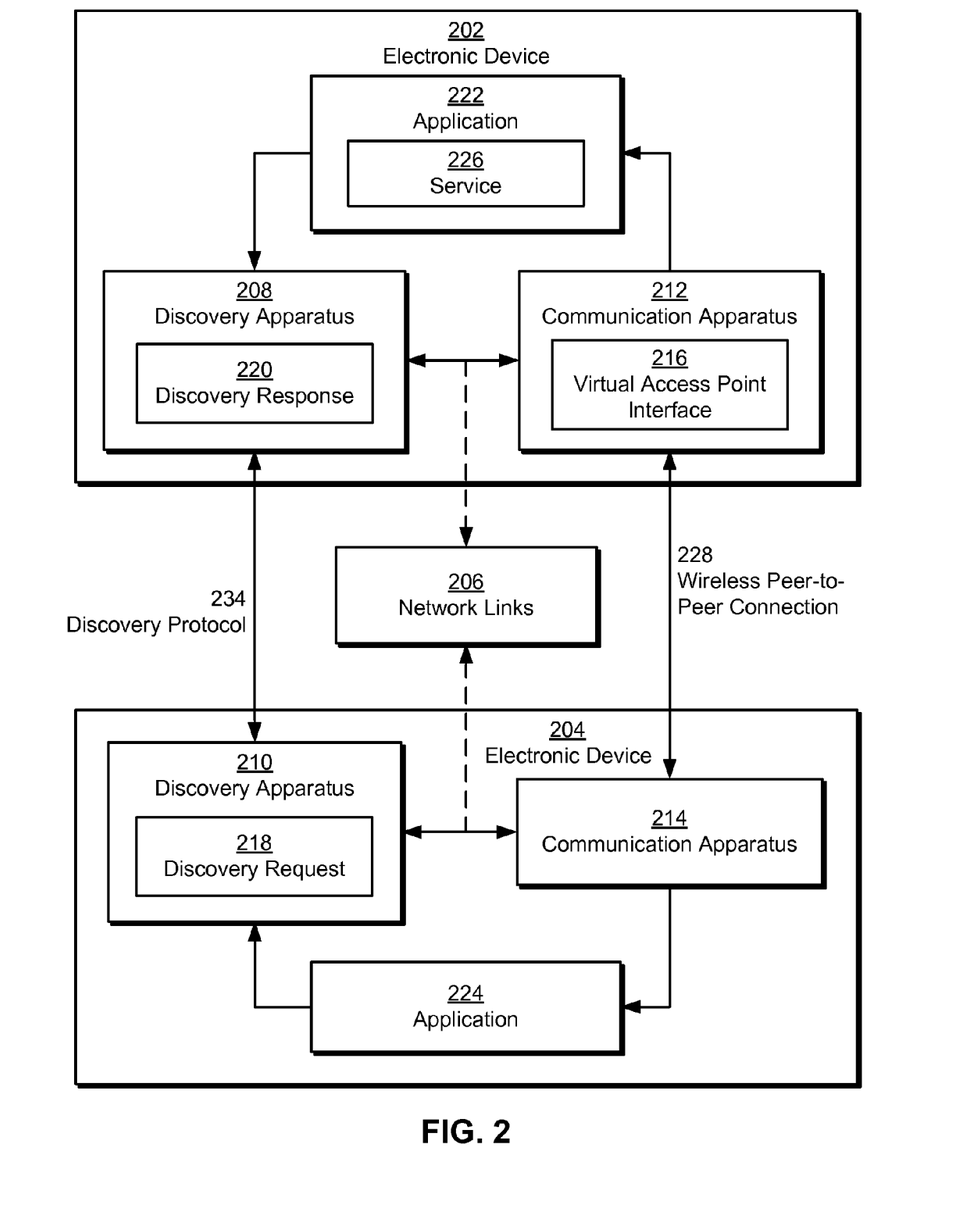
FIG. 2 shows a system for providing a service on an electronic device in accordance with the disclosed embodiments.

In one or more embodiments, electronic devices 110-112 include functionality to advertise, discover, and/or use services with one another in the absence of network links 106-108 and/or other existing network infrastructure between electronic devices 110-112. As shown in FIG. 2, a set of electronic devices 202-204 may be connected through one or more network links 206 (e.g., access points, routers, cellular towers, etc.) of a structured network, such as network 102 of FIG. 1. Conversely, network links 206 may not be available (e.g., out of range, secured, etc.) to one or both electronic devices 202-204, and electronic devices 202-204 may be unable to connect to one another through the structured network.

To enable use of a service 226 provided by an application 222 on electronic device 202 by an application 224 on electronic device 204 without communicating through network links 206 and/or other existing network infrastructure, electronic device 202 may advertise service 226 through a virtual access point interface 216 and a discovery protocol 234 (e.g., Bonjour). In turn, electronic device 204 may discover and use service 226 through discovery protocol 234 and virtual access point interface 216.

In particular, a discovery apparatus 208 on electronic device 202 may receive an advertising request for service 226 from application 222. The advertising request may include a request to advertise service 226 using a non-infrastructure mechanism. For example, the advertising request may include a flag and/or indicator for advertising service 226 through virtual access point interface 216 and/or another ad hoc peer-to-peer mechanism. Alternatively, application 222 may be unaware of the availability of virtual access point interface 216 on electronic device 202, and the advertising request may omit the request to advertise service 226 using virtual access point interface 216.

In response to the advertising request, discovery apparatus 208 and/or a communication apparatus 212 on electronic device 202 may enable virtual access point interface 216. For example, communication apparatus 212 may activate virtual access point interface 216 after receiving the advertising request and/or a request to activate virtual access point interface 216 from discovery apparatus 208. To create virtual access point interface 216, communication apparatus 212 may configure a radio on electronic device 202 to operate as a "lightweight" access point and/or provide a wireless ad hoc network.

Communication apparatus 212 may also include functionality to connect to a structured network (e.g., through network links 206) while providing virtual access point interface 216. For example, communication apparatus 212 may concurrently provide network connectivity through a connection with a WiFi network and an ad hoc mechanism for advertising service 226 through virtual access point interface 216.

To advertise service 226, discovery apparatus 208 and/or communication apparatus 212 may enable the detection of virtual access point interface 216 and/or service 226 by other electronic devices (e.g., electronic device 204) in proximity to electronic device 202. For example, discovery apparatus 208 and/or communication apparatus 212 may periodically transmit a beacon frame containing information about virtual access point interface 216 and/or service 226. The beacon frame may specify a set of capabilities, supported data rates, and/or an identifier (e.g., an 802.11 service set identifier (SSID)) for virtual access point interface 216. The beacon frame may also include one or more information elements describing service 226, support for discovery protocol 234, and/or other unique attributes of virtual access point interface 216. Discovery apparatus 208 and/or communication apparatus 212 may also receive probe request frames from the other electronic devices and transmit probe response frames containing the same information as the beacon frame to the other electronic devices.

As shown in FIG. 2, electronic device 204 may also include a discovery apparatus 210 and a communication apparatus 214. Discovery apparatus 210 and/or communication apparatus 214 may include functionality to detect virtual access point interface 216, even if discovery apparatus 210 and/or communication apparatus 214 do not include functionality to provide a separate virtual access point interface on electronic device 204. For example, discovery apparatus 210 may receive a browse request from application 224 to browse and/or scan for services advertised on nearby electronic devices, such as electronic device 202. Communication apparatus 214 may scan for the nearby electronic devices by transmitting a probe request frame on each channel of one or more 802.11 bands supported by communication apparatus 214. During the scan, communication apparatus 214 may receive a beacon frame and/or a probe response frame on the channel used by communication apparatus 212. Moreover, the beacon frame and/or probe response frame may include information about virtual access point 216 and/or service, as described above.

Next, discovery apparatus 210 and/or communication apparatus 214 may perform discovery of service 226 using information obtained during the scan for nearby electronic devices. To initiate discovery of service 226, discovery apparatus 210 and/or communication apparatus 214 may use discovery protocol 234 to transmit a discovery request 218 for service 226 to electronic device 202. For example, discovery apparatus 210 and/or communication apparatus 214 may transmit discovery request 218 as a Generic Advertisement Service (GAS) frame containing a browsed identifier for service 226. The browsed identifier may be provided by application 224 in the browse request to discovery apparatus 210. In other words, the browsed identifier may identify service 226 as a service that application 224 is interested in using.

In one or more embodiments, discovery request 218 also includes one or more service offerings on electronic device 204. For example, discovery request 218 may include advertised identifiers (e.g., service types) for the service offerings, data associated with the service offerings, and/or other information that enables discovery of the service offerings by electronic device 202. In other words, discovery request 218 may provide information about services advertised on electronic device 204 and request information about services advertised on electronic device 202 at the same time. Discovery request 218 may thus facilitate mutual and/or "symmetric" discovery of services between electronic devices 202-204, as discussed in further detail below with respect to FIG. 3.

In response to discovery request 218, discovery apparatus 208 and/or communication apparatus 212 may generate a discovery response 220 to discovery request 218. Discovery response 220 may include data associated with service 226. For example, discovery response 220 may include the browsed identifier (e.g., service type) for service 226, a unique name for service 226, and/or other information that allows electronic device 204 to sufficiently discover service 226. Discovery apparatus 208 and/or communication apparatus 212 may then complete discovery of service 226 by electronic device 204 by transmitting discovery response 220 to electronic device 204.

While service 226 is being advertised and/or discovered, discovery apparatus 208 and/or communication apparatus 212 may also perform discovery of services advertised by electronic devices in proximity to electronic device 202, such as electronic device 204. For example, application 222 may send a browse request to discovery apparatus 208, and discovery apparatus 208 and/or communication apparatus 212 may scan for nearby electronic devices by sending probe request frames over a range of 802.11 channels and receiving probe response frames for the probe request frames from the nearby electronic devices. Discovery apparatus 208 and/or communication apparatus 212 may then use information from the browse request, probe response frames, and/or discovery protocol 234 to transmit discovery requests to the nearby electronic devices and receive discovery responses to the discovery requests from the nearby electronic devices.

Once a service (e.g., service 226) is discovered by an electronic device (e.g., electronic device 204), the service may be used by the electronic device. For example, communication apparatus 214 may use the unique name for service 226 from discovery response 220 to perform a Domain Name System (DNS) lookup of the network address, port number, and/or other configuration information for accessing service 226 on electronic device 202. Alternatively, communication apparatus 214 may obtain the configuration information directly from discovery response 220. Communication apparatus 214 may subsequently use the configuration information and virtual access point interface 216 to establish a wireless peer-to-peer connection 228 with electronic device 202, and electronic device 204 may use service 226 through wireless peer-to-peer connection 228.

As mentioned above, electronic devices 202-204 may also be connected through an infrastructure connection provided by network links 206 and/or other existing network infrastructure. If the infrastructure connection is available and associated with a more robust connection (e.g., higher signal strength, more bandwidth, etc.) than wireless peer-to-peer connection 228, communication apparatuses 212-214 may use the infrastructure connection to provide service 226 to electronic device 204. Conversely, if no infrastructure connection is available and/or the infrastructure connection is less robust than wireless peer-to-peer connection 228, electronic device 204 may continue to use wireless peer-to-peer connection 228 to access service 226 until use of service 226 by electronic device 204 is complete.

Discovery apparatus 208 and/or communication apparatus 212 may also continue advertising service 226 and/or providing virtual access point interface 216 until a termination of advertising for service 226 is received from application 222. For example, application 222 may transmit a request to terminate advertising for service 226 to discovery apparatus 208, and discovery apparatus 208 may discontinue advertising of service 226 through virtual access point interface 216. Communication apparatus 212 may also disable virtual access point interface 216 if no other services are being advertised through virtual access point interface 216.

Consequently, virtual access point interface 216 may allow electronic devices 202-204 to advertise, discover, and use services (e.g., service 226) with one another in the absence of an infrastructure connection between electronic devices 202-204. In addition, advertising of services on each electronic device may be streamlined by enabling a virtual access point interface (e.g., virtual access point interface 216) upon receiving advertising requests for the services instead of after negotiating with other electronic devices to select a provider of the virtual access point interface. Finally, transmission of discovery requests (e.g., discovery request 218) containing service offerings may enable the "symmetric" discovery of services between electronic devices 202-204 and reduce delays associated with conventional, "asymmetric" service discovery that requires the transmission of discovery requests and discovery responses by both electronic devices 202-204 to mutually discover services on electronic devices 202-204.

Those skilled in the art will appreciate that the system of FIG. 2 may be implemented in a variety of ways. First, discovery apparatuses 208-210 and communication apparatuses 212-214 on each electronic device 202-204 may be provided by the same software and/or hardware component, or discovery apparatuses 208-210 and communication apparatuses 212-214 may execute independently from one another. For example, discovery apparatuses 208-210 and communication apparatuses 212-214 may be implemented using different combinations of an application processor, a baseband processor, a multi-core processor, a single-core processor, an operating system kernel, a standalone application, and/or a driver.

Second, electronic devices 202-204 may use various techniques to advertise and discover services. For example, electronic devices 202-204 may use different types and/or sequences of 802.11 frames and/or other networking mechanisms to scan for other electronic devices, discover services on the other electronic devices, and/or advertise services to the other electronic devices.

Figure 3:
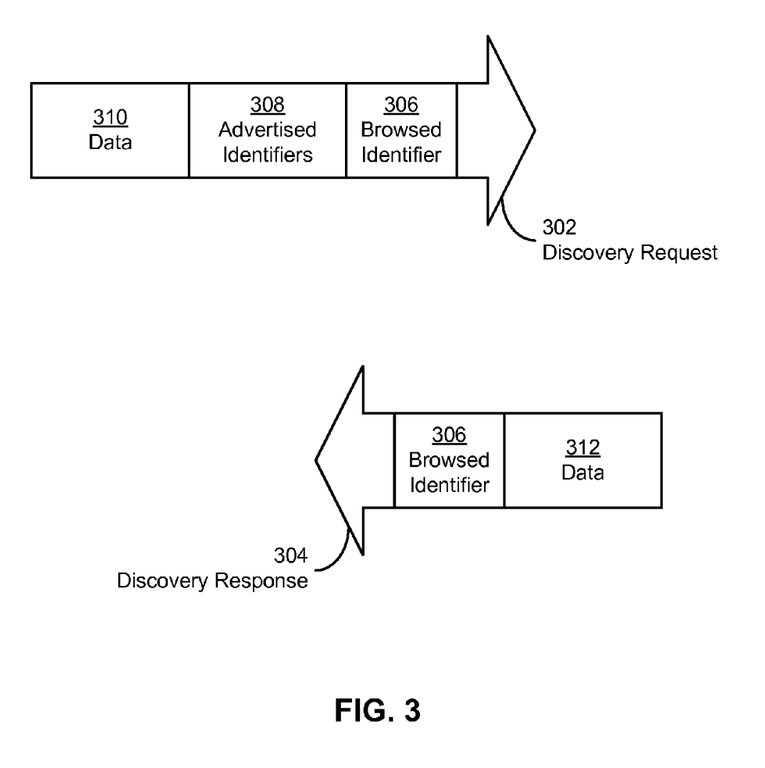
FIG. 3 shows a discovery request and a discovery response in accordance with the disclosed embodiments.

FIG. 3 shows a discovery request 302 and a discovery response 304 in accordance with the disclosed embodiments. Discovery request 302 and discovery response 304 may allow a service on a first electronic device (e.g., electronic devices 202-204 of FIG. 2) to be discovered by a second electronic device. As a result, discovery request 302 may be transmitted by the second electronic device to initiate discovery of the service on the first electronic device. To identify the service, discovery request 302 may include a browsed identifier 306 for the service. For example, the second electronic device may obtain a Bonjour service type for the service from an application on the second electronic device that is interested in using the service. The second electronic device may include the Bonjour service type as browsed identifier 306 in discovery request 302 to request more information about the service.

As shown in FIG. 3, discovery request 302 may also include a set of advertised identifiers 308 and a set of data 310. As mentioned above, advertised identifiers 308 and data 310 may specify one or more service offerings (e.g., advertised services) on the second electronic device. For example, advertised identifiers 308 may be service types for the service offerings, and data 310 may include unique names for the service offerings, descriptions of the service offerings, and/or other information that enables discovery of the service offerings by the first electronic device and/or other nearby electronic devices. Furthermore, advertised identifiers 308 and data 310 may apply to service offerings that are analogous and/or related to the service, or advertised identifiers 308 and data 310 may describe a variety of service offerings on the second electronic device, including those not related to the service.

The first electronic device may generate discovery response 304 in response to discovery request 302 and transmit discovery response 304 to the second electronic device. Because discovery request 302 contains advertised identifiers 308 and data 310, the first electronic device may omit the transmission of a different discovery request to the second electronic device to discover services (e.g., the service offerings) advertised by the second electronic device.

Like discovery request 302, discovery response 304 may include browsed identifier 306 to identify the service being discovered. Discovery response 304 may also include data 312 associated with the service. For example, discovery response 304 may include a unique name for the service, a description of the service, a graphic (e.g., icon) related to the service, and/or other information related to discovery of the service. Once discovery response 304 is received by the second electronic device, each electronic device will have discovered one or more services on the other electronic device.

The first and/or second electronic devices may use information in discovery request 302 and/or discovery response 304 to use the service. More specifically, the second electronic device may use data 312 from discovery response 304 to establish a network connection (e.g., wireless peer-to-peer connection, infrastructure connection, etc.) with the first electronic device. Alternatively, the first electronic device may use data 310 from discovery request 302 to initiate the network connection with the second electronic device. Once the network connection is initiated, the first electronic device may provide the service to the second electronic device through the network connection, or the first electronic device may initiate use of an analogous and/or related service on the second electronic device.

For example, the first and second electronic devices may both advertise a peer-to-peer file transfer service and use discovery request 302 and discovery response 304 to perform "symmetric" discovery of the peer-to-peer file transfer service. Each electronic device may then use information from discovery request 302 and/or discovery response 304 to establish a peer-to-peer connection with the other electronic device and transfer a file over the peer-to-peer connection to the other electronic device.

Figure 4:
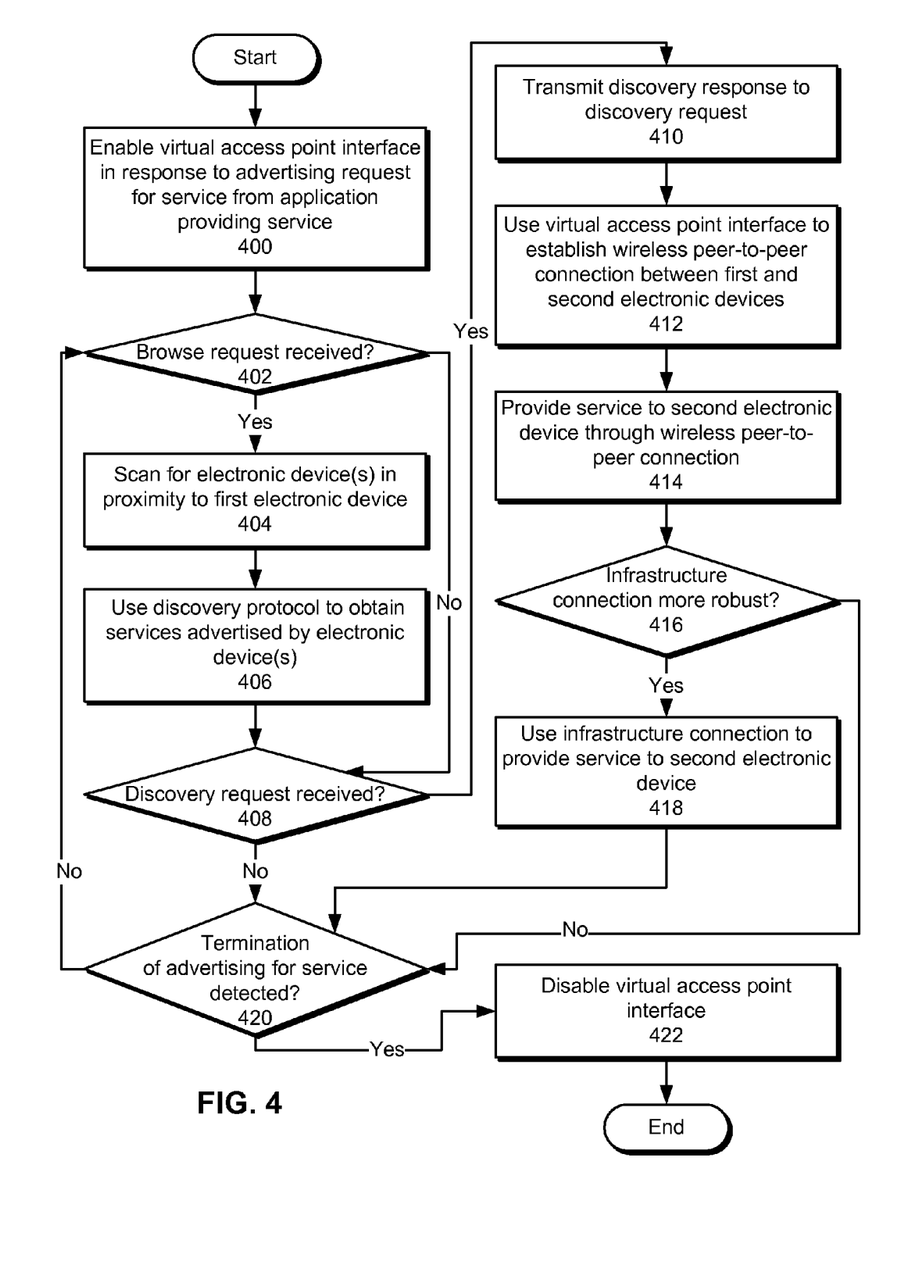
FIG. 4 shows a flowchart illustrating the process of providing a service on a first electronic device in accordance with the disclosed embodiments.

FIG. 4 shows a flowchart illustrating the process of providing a service on a first electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, a virtual access point interface and a discovery protocol are used to advertise the service on the first electronic device. To advertise the service, the virtual access point interface is enabled in response to an advertising request for the service from an application providing the service (operation 400). The virtual access point interface may be enabled by configuring a radio on the electronic device to operate as a "lightweight" access point and/or provide a wireless ad hoc network. The advertising request may include a request to advertise the service using a non-infrastructure mechanism.

A browse request may also be received (operation 402) from the application. If the browse request is received, a scan for one or more electronic devices in proximity to the first electronic device is performed (operation 404). The scan may occur in response to a browse request from the application to the first electronic device. In addition, the scan may be performed independently of advertising of the service for the application. During the scan, a probe request frame may be transmitted on each channel of one or more bands used for wireless communication by the first electronic device. Probe response frames to the probe request frame may then be received from one or more electronic devices in proximity to the first electronic device. Once the electronic device(s) are detected by the scan, a discovery protocol is used to obtain a set of services advertised by the electronic device(s) (operation 406), as discussed in further detail below with respect to FIG. 5. In other words, discovery of services on other electronic devices may be performed by the first electronic device at the same time as advertising of the service to the other electronic devices. If no browse request is received, scanning and/or browsing of services on other electronic devices may not be performed by the first electronic device.

A discovery request may be received (operation 408) from a second electronic device through the virtual access point interface. If a discovery request is not received, discovery of the service may not be performed. If a discovery request is received, a discovery response to the discovery request is transmitted (operation 410). The discovery response may contain information that allows the second electronic device to discover the service. In addition, the discovery request may include one or more service offerings on the second electronic device, thus enabling discovery of the service offering(s) on the first electronic device without transmitting a separate discovery request to the second electronic device and receiving a discovery response from the second electronic device.

Next, the virtual access point interface is used to establish a wireless peer-to-peer connection between the first and second electronic devices (operation 412), and the service is provided to the second electronic device through the wireless peer-to-peer connection (operation 414). For example, the second electronic device may establish the wireless peer-to-peer connection by connecting to the virtual access point interface using information in a probe response frame from the first electronic device. The second electronic device may then use information from the discovery response and the wireless peer-to-peer connection to transfer files, share desktops, collaborate on documents, stream audio and/or video, and/or perform a print job with the first electronic device.

An infrastructure connection between the first and second electronic devices may be available and more robust (operation 416) than the wireless peer-to-peer connection. For example, the first and second electronic devices may be connected through a WiFi access point with higher signal strength and/or greater bandwidth than the wireless peer-to-peer connection. If the infrastructure connection is more robust than the wireless peer-to-peer connection, the infrastructure connection is used to provide the service to the second electronic device (operation 418). If the infrastructure connection is not more robust than the wireless peer-to-peer connection, the wireless peer-to-peer connection may continue to be used to provide the service to the second electronic device.

A termination of advertising for the service may be detected (operation 420). For example, the termination of advertising may be detected upon receiving a request from the application to discontinue advertising the service. If termination of advertising for the service is not detected, scanning and service discovery may continue to be performed on nearby electronic devices (operations 402-406) in conjunction with advertising of the service to the electronic devices (operations 408-410) and use of the service by the other electronic devices (operations 412-418). If termination of advertising for the service is detected, the virtual access point interface is disabled (operation 422), and the service is no longer advertised and/or offered through the virtual access point interface. Scanning and/or browsing of services from nearby electronic devices (operations 402-406) may continue until browsing of services is also disabled on the first electronic device.

Figure 5:
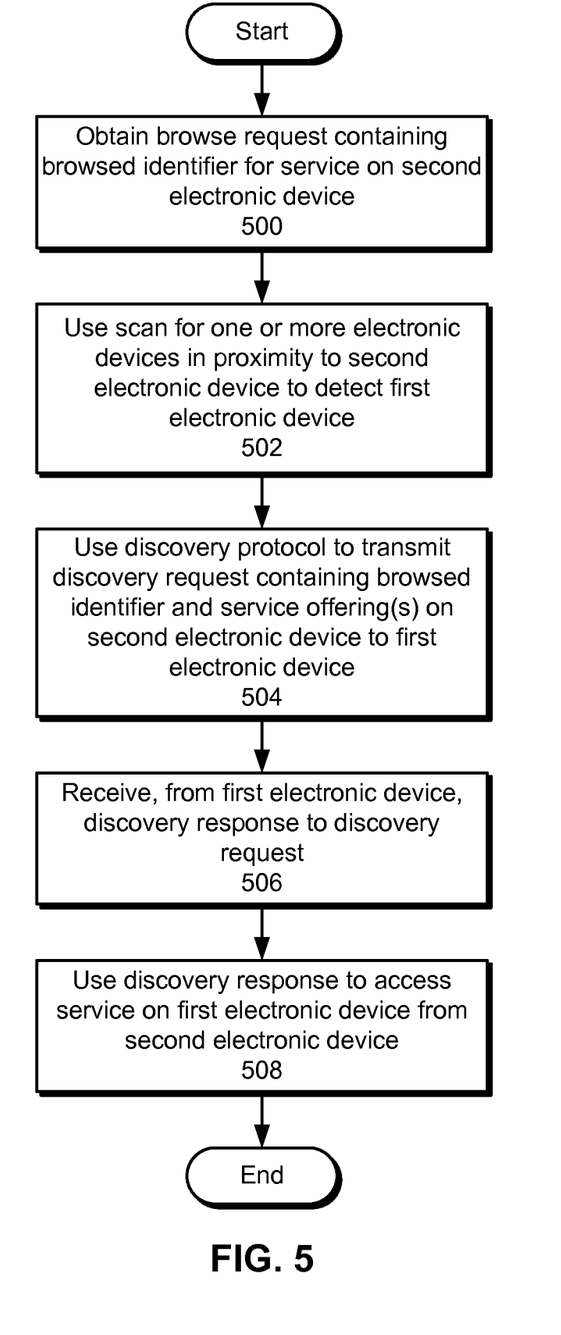
FIG. 5 shows a flowchart illustrating the process of using a service on a first electronic device in accordance with the disclosed embodiments.

FIG. 5 shows a flowchart illustrating the process of using a service on a first electronic device in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a browse request containing a browsed identifier for the service is obtained on the second electronic device (operation 500). For example, the second electronic device may obtain the browse request from an application on the second electronic device interested in using the service on nearby electronic devices, including the first electronic device.

Next, a scan for one or more electronic devices in proximity to the second electronic device is used to detect the first electronic device (operation 502). For example, the first electronic device may be detected by transmitting a probe request on a channel used by the first electronic device and receive a probe response to the probe request from the first electronic device.

After the first electronic device is detected, a discovery protocol is used to transmit a discovery request containing the browsed identifier and one or more service offerings on the second electronic device to the first electronic device (operation 504). Each service offering may include an advertised identifier for the service offering and data associated with the service offering. The service offering(s) may allow the first electronic device to discover services advertised by the second electronic device (e.g., the service offering(s)) without transmitting a separate discovery request to the second electronic device and obtaining a discovery response from the second electronic device, unlike existing and/or conventional service discovery techniques. In other words, the service offering(s) may facilitate "symmetric" discovery of services on the first and second electronic devices, whereas other discovery mechanisms may utilize slower, "asymmetric" discovery mechanisms.

A discovery response to the discovery request is then received from the first electronic device (operation 506) and used to access the service on the first electronic device from the second electronic device (operation 508). For example, the discovery response may include the browsed identifier and data associated with the service. The data may allow the second electronic device to establish a network connection (e.g., wireless peer-to-peer connection, infrastructure connection) with the first electronic device and access the service through the network connection. The first electronic device may also use the data from the second electronic device's discovery request to connect to the second electronic device and use services on the second electronic device.

Figure 6:
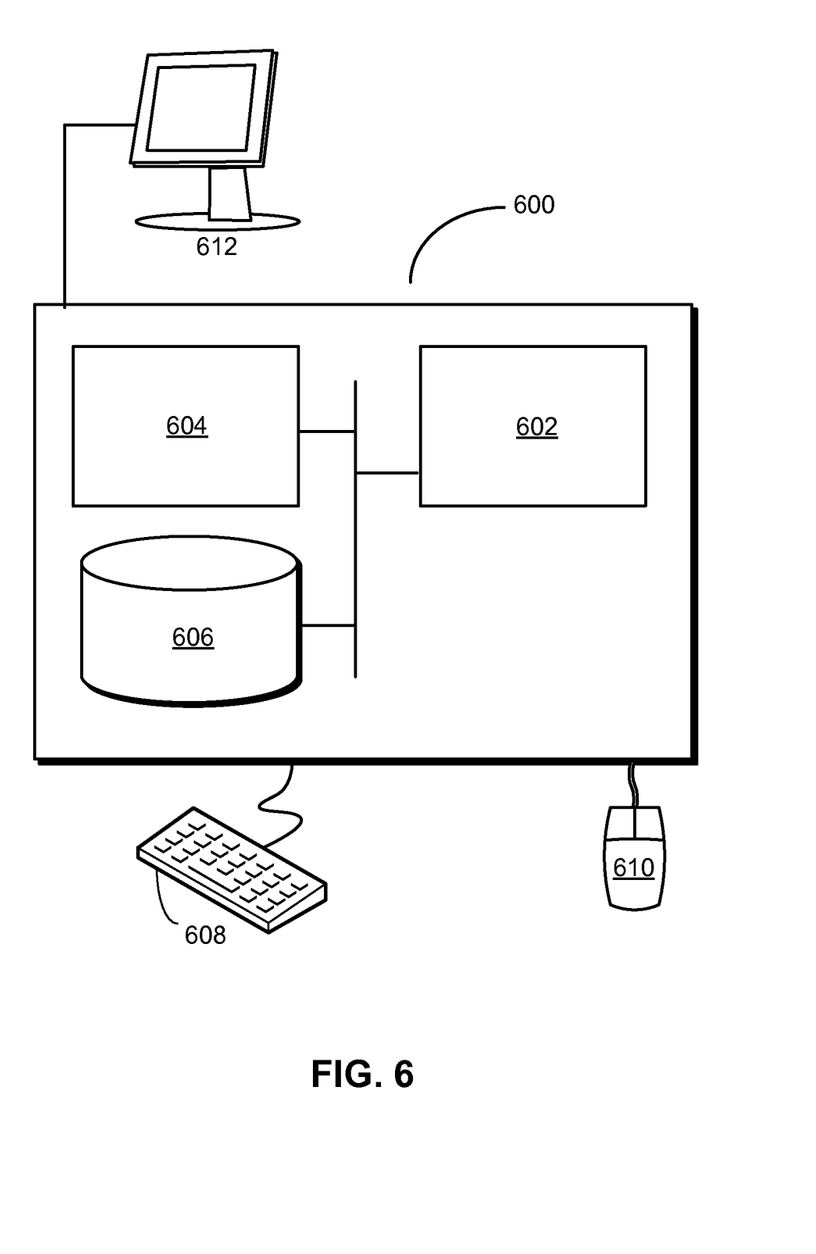
FIG. 6 shows a computer system in accordance with the disclosed embodiments.

FIG. 6 shows a computer system 600 in accordance with the disclosed embodiments. Computer system 600 may correspond to an apparatus that includes a processor 602, memory 604, storage 606, and/or other components found in electronic computing devices. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for providing a service on a first electronic device. The system may include a discovery apparatus that uses a virtual access point interface and a discovery protocol to advertise the service on the first electronic device. The virtual access point interface may enable discovery of the service by a second electronic device without an infrastructure connection between the first and second electronic devices. The system may also include a communication apparatus that provides the virtual access point interface and uses the virtual access point interface to establish a wireless peer-to-peer connection between the first electronic device and a second electronic device. The communication apparatus may also provide the service to the second electronic device through the wireless peer-to-peer connection.

In addition, one or more components of computer system 600 may be remotely located and connected to the other components over a network. Portions of the present embodiments (e.g., discovery apparatus, communication apparatus, electronic devices, etc.) may also be located on different nodes of a distributed system that implements the embodiments. For example, the present embodiments may be implemented using a number of electronic devices connected to one another through a set of wireless peer-to-peer connections and/or infrastructure connections.

Figure 7:
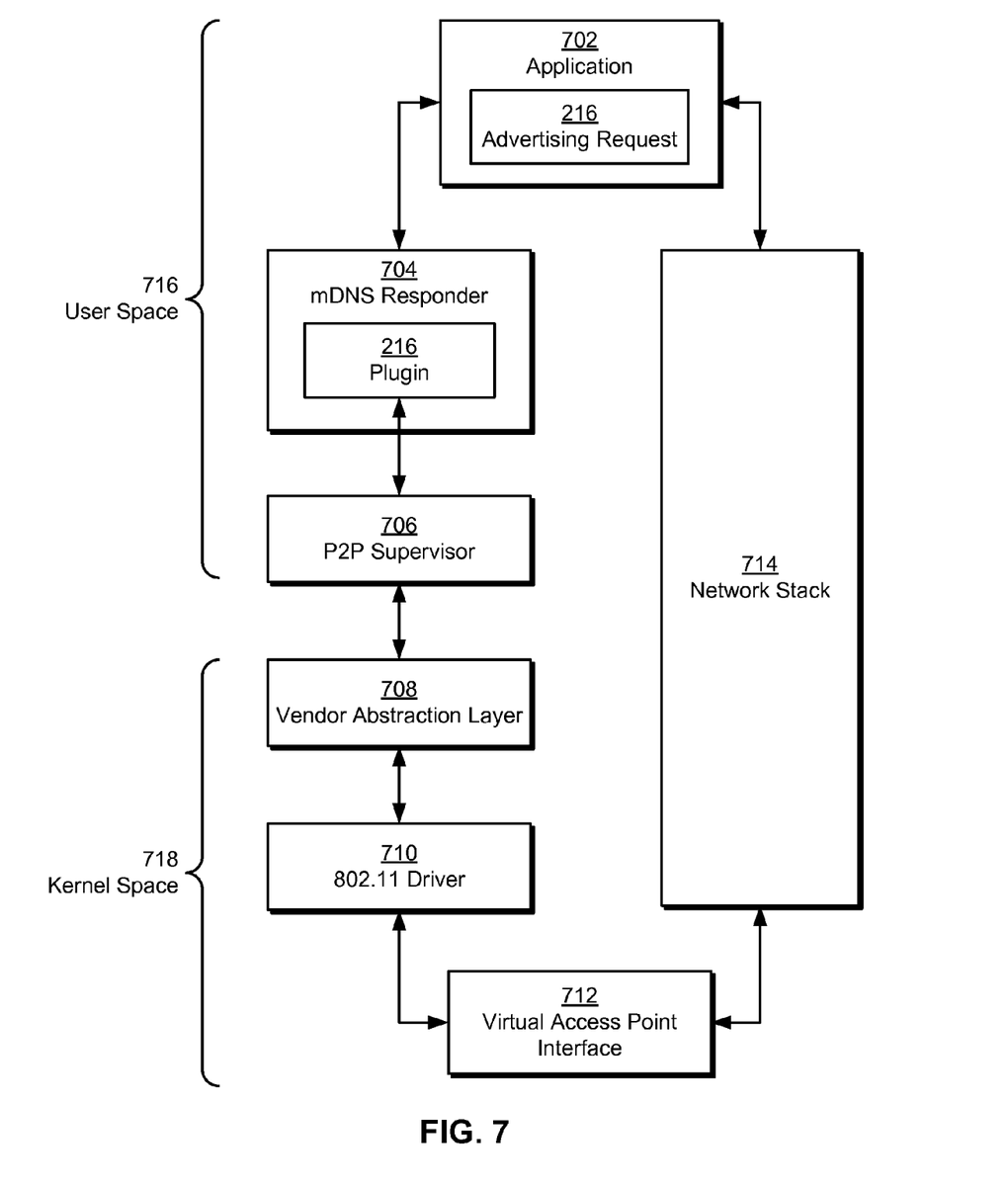
FIG. 7 shows an exemplary system for providing a virtual access point interface in accordance with the disclosed embodiments.

FIG. 7 shows an exemplary system for providing a virtual access point interface 712 in accordance with the disclosed embodiments. The system may be implemented on an electronic device, such as electronic device 202 of FIG. 2. As shown in FIG. 7, the system includes an application 702 that generates an advertising request 216 for a service provided by application 702. For example, application 702 may request advertising of a peer-to-peer file sharing service on the electronic device.

Application 702 may provide advertising request 216 to a multicast Domain Name System (mDNS) responder 704 that enables advertising of services by applications, and mDNS responder 704 may use a plugin 216 to transmit advertising request 216 to a peer-to-peer (P2P) supervisor 706. Application 702, mDNS responder 704, and P2P supervisor 706 may all reside in user space 716 on the electronic device.

Next, P2P supervisor 706 may transmit a message through a vendor abstraction layer 708 (e.g., an application programming interface (API)) to a vendor-specific 802.11 driver 710, and 802.11 driver 710 may create a new virtual access point interface 712. For example, 802.11 driver 710 may configure an 802.11 radio on the electronic device to provide virtual access point interface 712 by acting as a "lightweight" access point to nearby electronic devices. 802.11 driver 710 may also configure the radio to connect to a structured WiFi network while providing virtual access point interface 712. Vendor abstraction layer 708 and 802.11 driver 710 may reside in kernel space 718 on the electronic device.

P2P supervisor 706 may then advertise the service through beacon frames and/or probe response frames that are transmitted from virtual access point interface 712 to nearby electronic devices. P2P supervisor 706 may also receive discovery requests from the electronic devices through virtual access point interface 712, generate discovery responses to the discovery requests, and send the discovery responses to the discovery requests through 802.11 driver 710 and/or virtual access point interface 712. Finally, P2P supervisor 706 may send discovery requests to the electronic devices and receive discovery responses containing services advertised by the electronic devices.

To use the service provided by application 702, a second electronic device may establish a wireless P2P connection with the electronic device through virtual access point interface 712 and transmit packets through virtual access point interface 712 and a network stack 714 on the electronic device to application 702. Application 702 may also use the wireless P2P connection, network stack 714, and virtual access point interface 712 to transmit packets to the second electronic device, thus providing the service to the second electronic device. Finally, an infrastructure connection between the two electronic devices may be used to provide the service to the second electronic device if the infrastructure connection is available and more robust than the wireless P2P connection.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for providing a service on a first electronic device, comprising:
   receiving an advertising request for the service in the first electronic device from an application executing on the first electronic device that provides the service;
   enabling a virtual access point interface in the first electronic device in response to receiving the advertising request, the enabling comprising providing, from the first electronic device, a corresponding lightweight access point;
   using the virtual access point interface and a discovery protocol to advertise the service on the first electronic device, wherein the virtual access point interface enables discovery of the service by a second electronic device without an infrastructure connection between the first and second electronic devices;
   using the virtual access point interface to establish a wireless peer-to-peer connection between the first electronic device and a second electronic device;
   providing the service to the second electronic device through the wireless peer-to-peer connection;
   detecting a termination of advertising for the service, the detecting comprising receiving a request from the application to discontinue advertising the service; and
   based on the detecting, disabling the virtual access point interface.

2. The method of claim 1, further comprising:
   using the infrastructure connection to provide the service to the second electronic device when one or more operating conditions for the infrastructure connection meet corresponding criterion.

3. The method of claim 1, further comprising:
   scanning for one or more electronic devices; and
   upon detecting the one or more electronic devices, using the discovery protocol to obtain a set of services advertised by the one or more electronic devices.

4. The method of claim 1, wherein using the discovery protocol and the virtual access point interface to advertise the service on the first electronic device comprises:
   upon receiving a discovery request from the second electronic device through the virtual access point interface, transmitting a discovery response to the discovery request through the virtual access point interface, wherein the discovery response is used by the second electronic device to access the service.

5. The method of claim 1, wherein the advertising request comprises a request to advertise the service using a non-infrastructure mechanism.

6. The method of claim 4, wherein the discovery request comprises one or more service offerings on the second electronic device.

7. A system for providing a service on a first electronic device, comprising:
   a processor, wherein the processor performs operations for:
      a discovery apparatus configured to use a virtual access point interface and a discovery protocol to advertise the service on the first electronic device, wherein the virtual access point interface enables discovery of the service by a second electronic device without an infrastructure connection between the first and second electronic devices; and
      a communication apparatus configured to:
         receive an advertising request for the service in the first electronic device from an application executing on the first electronic device that provides the service;
         enable the virtual access point interface in the first electronic device in response to receiving the advertising request, the enabling comprising providing, from the first electronic device, a corresponding lightweight access point;
         use the virtual access point interface to establish a wireless peer-to-peer connection between the first electronic device and a second electronic device;
         provide the service to the second electronic device through the wireless peer-to-peer connection;
         detect a termination of advertising for the service, the detecting comprising receiving a request from the application to discontinue advertising the service; and
         based on the detecting, disable the virtual access point interface.

8. The system of claim 7, wherein the communication apparatus is further configured to:
   use the infrastructure connection to provide the service to the second electronic device when one or more operating conditions for the infrastructure connection meet corresponding criterion.

9. The system of claim 7, wherein the discovery apparatus is further configured to:
   scan for one or more electronic devices; and
   upon detecting the one or more electronic devices, use the discovery protocol to obtain a set of services advertised by the one or more electronic devices.

10. The system of claim 7, wherein using the discovery protocol and the virtual access point interface to advertise the service on the first electronic device comprises:
    upon receiving a discovery request from the second electronic device through the virtual access point interface, transmitting a discovery response to the discovery request through the virtual access point interface, wherein the discovery response is used by the second electronic device to access the service.

11. The system of claim 7, wherein the advertising request comprises a request to advertise the service using a non-infrastructure mechanism.

12. The system of claim 10, wherein the discovery request comprises one or more service offerings on the second electronic device.

13. The system of claim 10, wherein the discovery response comprises:
    a browsed identifier for the service; and
    data associated with the service.

14. A non-transitory computer-readable storage medium storing instructions that when executed by a computer cause the computer to perform a method for providing a service on a first electronic device, the method comprising:
    receiving an advertising request for the service in the first electronic device from an application executing on the first electronic device that provides the service;
    enabling a virtual access point interface in the first electronic device in response to receiving the advertising request, the enabling comprising providing, from the first electronic device, a corresponding lightweight access point;
    using the virtual access point interface and a discovery protocol to advertise the service on the first electronic device, wherein the virtual access point interface enables discovery of the service by a second electronic device without an infrastructure connection between the first and second electronic devices;
    using the virtual access point interface to establish a wireless peer-to-peer connection between the first electronic device and a second electronic device;
    providing the service to the second electronic device through the wireless peer-to-peer connection;
    detecting a termination of advertising for the service, the detecting comprising receiving a request from the application to discontinue advertising the service; and
    based on the detecting, disabling the virtual access point interface.

15. The computer-readable storage medium of claim 14, the method further comprising:
    using the infrastructure connection to provide the service to the second electronic device when one or more operating conditions for the infrastructure connection meet corresponding criterion.

16. The computer-readable storage medium of claim 14, wherein using the discovery protocol and the virtual access point interface to advertise the service on the first electronic device comprises:
    upon receiving a discovery request from the second electronic device through the virtual access point interface, transmitting a discovery response to the discovery request through the virtual access point interface, wherein the discovery response is used by the second electronic device to access the service.

17. The computer-readable storage medium of claim 16, wherein the discovery request comprises one or more service offerings on the second electronic device.

* * * * *